(12) United States Patent
Nelluri et al.

(10) Patent No.: US 11,811,668 B2
(45) Date of Patent: Nov. 7, 2023

(54) SYSTEM FOR IMPLEMENTING DISPOSITION BIAS FOR VALIDATING NETWORK TRAFFIC FROM UPSTREAM APPLICATIONS

(71) Applicant: BANK OF AMERICA CORPORATION, Charlotte, NC (US)

(72) Inventors: Govindarajulu Nelluri, Telangana (IN); Ramesh Anantarapu, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/406,290

(22) Filed: Aug. 19, 2021

(65) Prior Publication Data
US 2023/0054697 A1  Feb. 23, 2023

(51) Int. Cl.
*H04L 47/2408* (2022.01)
*H04L 47/2491* (2022.01)
*H04L 47/2416* (2022.01)
*H04L 47/125* (2022.01)

(52) U.S. Cl.
CPC ........ *H04L 47/2408* (2013.01); *H04L 47/125* (2013.01); *H04L 47/2416* (2013.01); *H04L 47/2491* (2013.01)

(58) Field of Classification Search
CPC ............... H04L 47/2408; H04L 47/125; H04L 47/2416; H04L 47/2491
See application file for complete search history.

(56) References Cited

U.S. PATENT DOCUMENTS

| | | |
|---|---|---|
| 5,557,742 A | 9/1996 | Smaha et al. |
| 5,899,995 A | 5/1999 | Millier et al. |
| 5,941,947 A | 8/1999 | Brown et al. |
| 5,987,611 A | 11/1999 | Freund |
| 5,991,399 A | 11/1999 | Graunke et al. |
| 6,154,844 A | 11/2000 | Touboul et al. |
| 6,195,587 B1 | 2/2001 | Hruska et al. |
| 6,301,668 B1 | 10/2001 | Gleichauf et al. |
| 6,310,873 B1 | 10/2001 | Rainis et al. |
| 6,330,670 B1 | 12/2001 | England et al. |
| 6,381,579 B1 | 4/2002 | Gervais et al. |
| 6,460,141 B1 | 10/2002 | Olden |
| 6,505,300 B2 | 1/2003 | Chan et al. |
| 8,326,910 B2 * | 12/2012 | Bobak ................. H04L 41/0843 709/200 |
| 9,270,674 B2 * | 2/2016 | Lang ...................... G06F 21/51 |
| 11,153,177 B1 * | 10/2021 | Hermoni ............. H04L 43/0876 |

(Continued)

*Primary Examiner* — John A Follansbee
*Assistant Examiner* — Fadi Haj Said
(74) *Attorney, Agent, or Firm* — Moore & Van Allen PLLC; Anup Shrinivasan Iyer

(57) ABSTRACT

Systems, computer program products, and methods are described herein for validating network traffic from upstream applications. The present invention is configured to electronically receive datastream from an upstream application; initiate a traffic bias management engine (TBME) on the datastream; determine, using the TMBE, an information bias for the upstream application based on at least initiating the TBME on the datastream; determine a validation level for the upstream application based on at least the information bias; and validate the upstream application based on at least the validation level.

20 Claims, 4 Drawing Sheets

(56) References Cited

U.S. PATENT DOCUMENTS

| | | | |
|---|---|---|---|
| 2001/0037433 A1 | 11/2001 | Dempsey et al. | |
| 2001/0044904 A1 | 11/2001 | Berg et al. | |
| 2002/0026436 A1 | 2/2002 | Joory | |
| 2002/0049834 A1 | 4/2002 | Molnar | |
| 2002/0095503 A1 | 7/2002 | Huang | |
| 2002/0133535 A1 | 9/2002 | Lucovsky et al. | |
| 2002/0178271 A1 | 11/2002 | Graham et al. | |
| 2002/0194525 A1 | 12/2002 | Mathiske et al. | |
| 2012/0124197 A1* | 5/2012 | Ghai | H04L 43/12 709/224 |

* cited by examiner

SYSTEM FOR IMPLEMENTING DISPOSITION BIAS FOR VALIDATING NETWORK TRAFFIC FROM UPSTREAM APPLICATIONS

FIELD OF THE INVENTION

The present invention embraces a system for implementing disposition bias for validating network traffic from upstream applications.

BACKGROUND

Application integration involves the use of Application Programming Interfaces (APIs) to enable applications and systems that were built separately to work together, resulting in new capabilities and efficiencies that cut costs, uncover insights, and much more. In cases where each application is designed for its own specific purpose, but the data processed by one (upstream application) is being used as input by another (downstream application), any errors or issues occurring in the former, inevitably propagates to the latter. Identification and mitigation of these issues tend to be tedious resulting in loss of data, time, and resources. In larger enterprises, it is typically difficult to keep track of the different applications that are being used, let alone be able to identify and mitigate any issues that occur. Entities often allocate a large number of resources (personnel and computing) to validate any traffic generated by these applications in an attempt to track, identify, and mitigate issues. While some are successful, the cost to implement such a system and the processing burden on the technology infrastructure overall are major concerns. There is a need for a system to identify the most efficient means of resource allocation to validate applications, i.e., maximizing the identification and mitigation of issues while minimizing the processing burden on the technology infrastructure.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for implementing disposition bias for validating network traffic from upstream applications is presented. The system comprising: at least one non-transitory storage device; and at least one processing device coupled to the at least one non-transitory storage device, wherein the at least one processing device is configured to: electronically receive datastream from an upstream application; initiate a traffic bias management engine (TBME) on the datastream; determine, using the TBME, an information bias for the upstream application based on at least initiating the TBME on the datastream; determine a validation level for the upstream application based on at least the information bias; and validate the upstream application based on at least the validation level.

In some embodiments, initiating the TBME on the datastream further comprises: determining one or more requirements for the upstream application, wherein the one or more requirements are associated with one or more parameters and one or more thresholds for the one or more parameters; continuously retrieving one or more data values from the datastream for the one or more parameters; determining whether the one or more data values meets the one or more thresholds; and determining the information bias for the upstream application based on at least determining whether the one or more data values meets the one or more thresholds.

In some embodiments, determining the information bias for the upstream application further comprises: initiating a machine learning model on the one or more data values from the datastream for the one or more parameters and the one or more requirements for the upstream application; and determining, using the machine learning model, the information bias for the upstream application.

In some embodiments, the one or more requirements comprises at least pre-processing requirements and post-processing requirements.

In some embodiments, the at least one processing device is further configured to: continuously retrieve the one or more data values from the datastream for the one or more parameters; determine that the one or more data values for at least a first portion of the one or more parameters meets the one or more thresholds at a first time instant; determine a first information bias for the upstream application based on at least determining that the one or more data values for at least the first portion of the one or more parameters meets the one or more thresholds; and determine a first validation level for the datastream based on at least the first information bias.

In some embodiments, the at least one processing device is further configured to: determine that the one or more data values for at least a second portion of the one or more parameters meets the one or more thresholds at a second time instant; determine a second information bias for the upstream application based on at least determining that the one or more data values for at least the second portion of the one or more parameters meets the one or more thresholds; and dynamically modify the first validation level to a second validation level for the datastream based on at least the second information bias.

In some embodiments, validating the upstream application further comprises: determining a first set of computing resources to validate the upstream application based on at least the validation level; and validate the upstream application using the first set of computing resources.

In some embodiments, the at least one processing device is further configured to: initiate a dashboard script configured to generate a dynamic bias display interface comprising at least the information bias, the validation level, and a validation status of the upstream application.

In another aspect, a computer program product for implementing disposition bias for validating network traffic from upstream applications is presented. The computer program product comprising a non-transitory computer-readable medium comprising code causing a first apparatus to: electronically receive datastream from an upstream application; initiate a traffic bias management engine (TBME) on the datastream; determine, using the TBME, an information bias for the upstream application based on at least initiating the TBME on the datastream; determine a validation level for the upstream application based on at least the information bias; and validate the upstream application based on at least the validation level.

In yet another aspect, a method for implementing disposition bias for validating network traffic from upstream applications is presented. The method comprising: electronically receiving datastream from an upstream application; initiating a traffic bias management engine (TBME) on the datastream; determining, using the TBME, an information bias for the upstream application based on at least initiating the TBME on the datastream; determining a validation level for the upstream application based on at least the information bias; and validating the upstream application based on at least the validation level.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
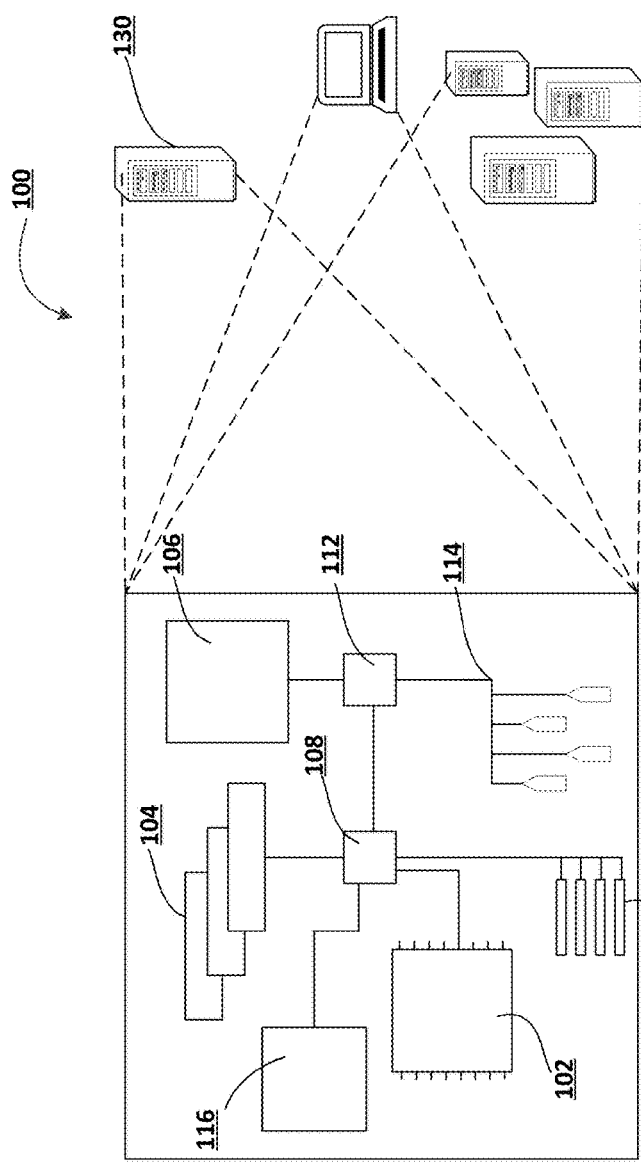
Figure 1:
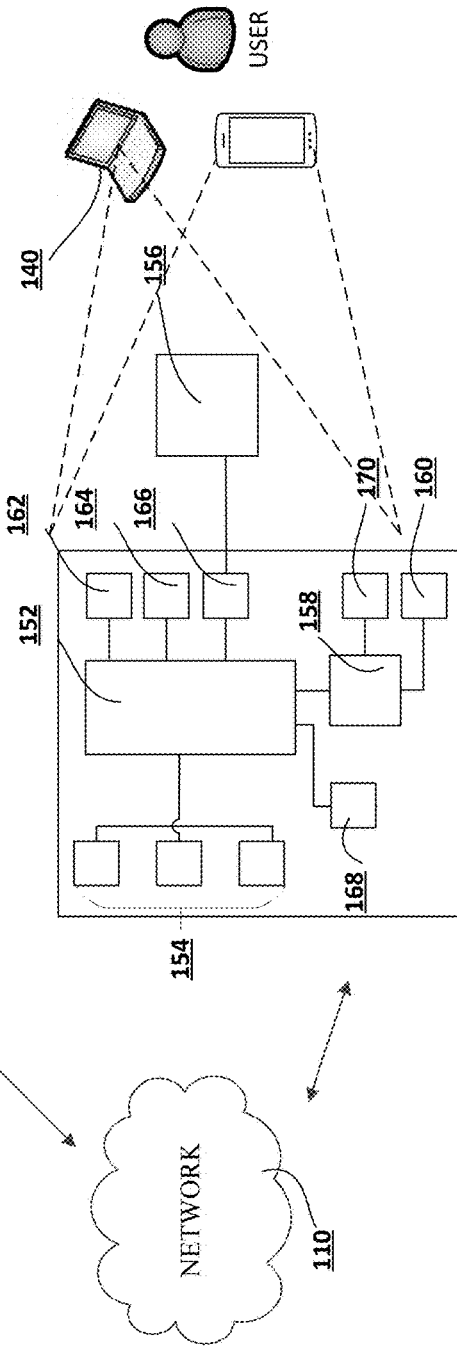
Figure 2:
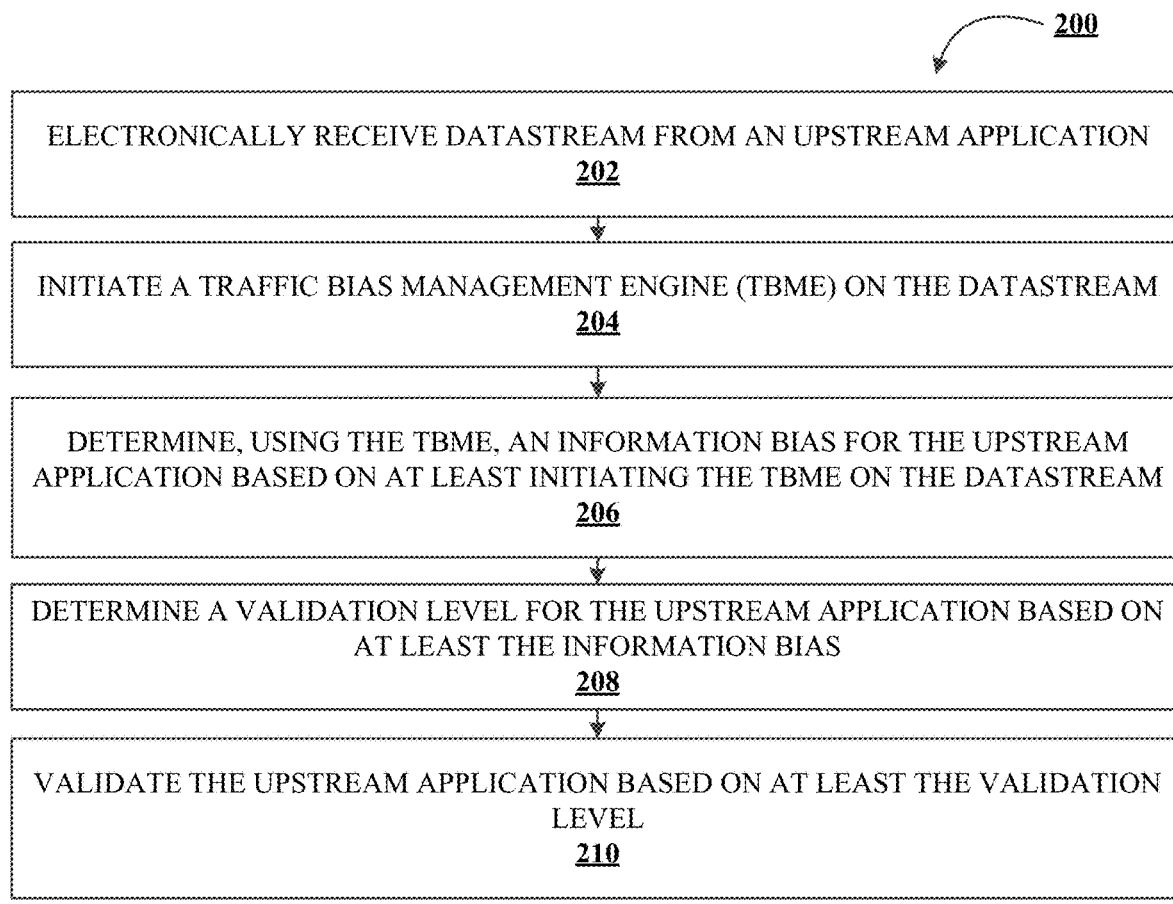
Figure 3:
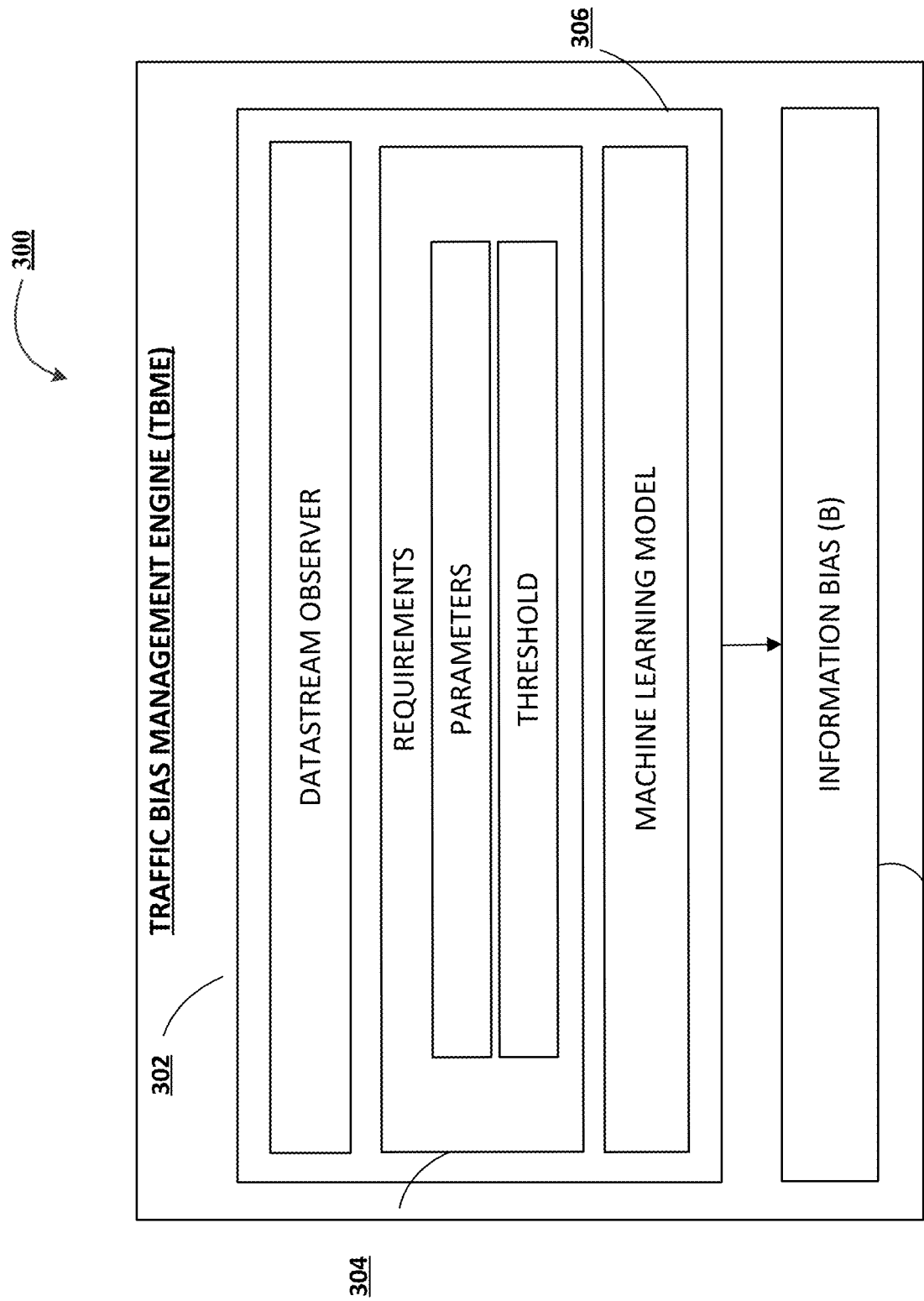
Figure 4:
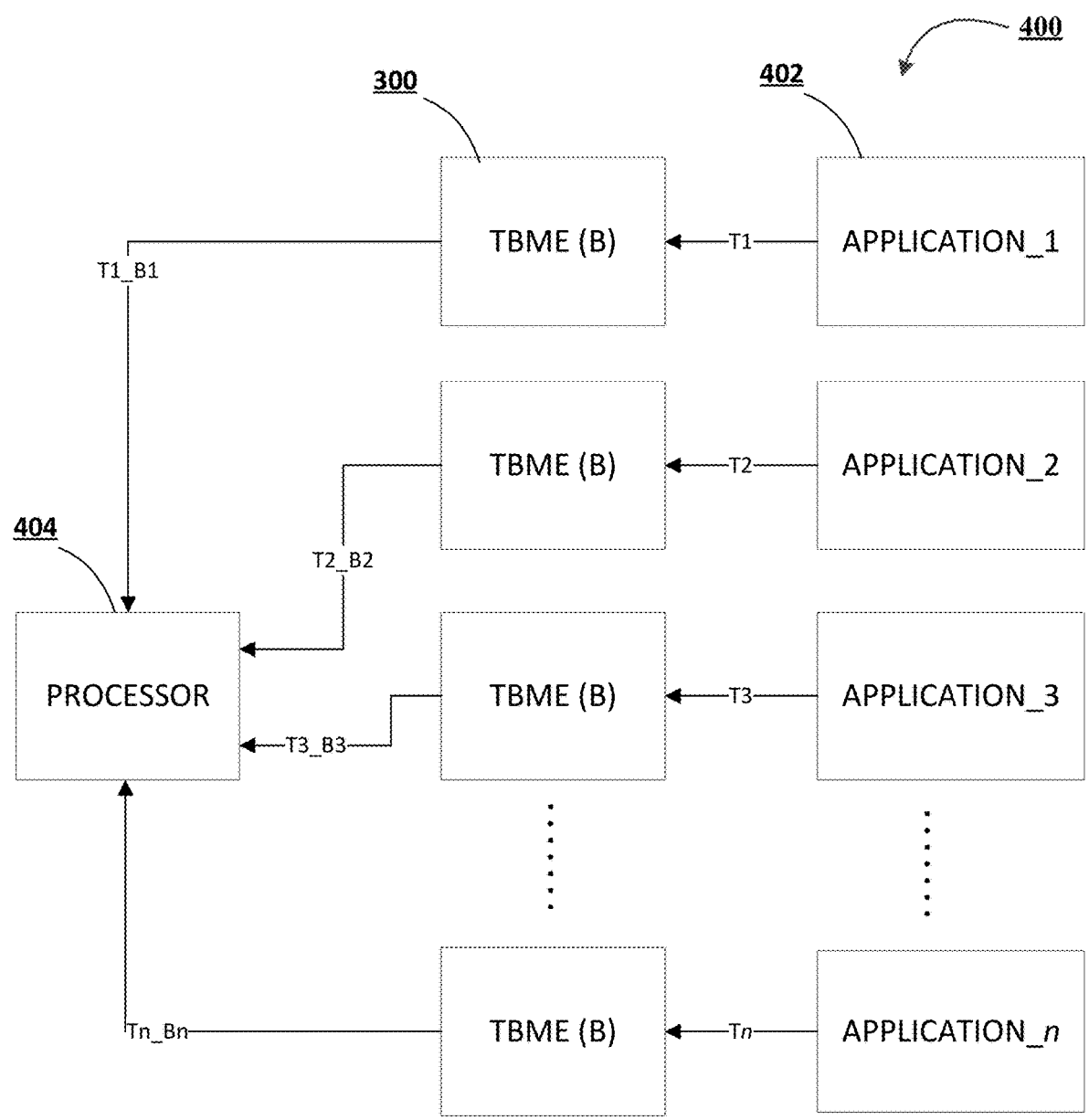

Having thus described embodiments of the invention in general terms, reference will now be made the accompanying drawings, wherein:

FIG. 1 illustrates technical components of a system for implementing disposition bias for validating network traffic from upstream applications, in accordance with an embodiment of the invention;

FIG. 2 illustrates a process flow for implementing disposition bias for validating network traffic from upstream applications, in accordance with an embodiment of the invention;

FIG. 3 illustrates a Traffic Bias Management Engine (TBME), in accordance with an embodiment of the invention; and FIG. 4 illustrates a data flow diagram for implementing disposition bias, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, a "resource" may refer to electronic components associated with the technology infrastructure (e.g., system environment described herein) of the entity. These electronic components include software components such as applications, databases, data files, and/or the like, hardware components such as computing devices, network devices, and/or the like, network components such as server, client, peer, transmission medium, connecting devices, and/or the like, and any other electronic component associated with the technology infrastructure.

As used herein, "machine learning algorithms" may refer to programs (math and logic) that are configured to self-adjust and perform better as they are exposed to more data. To this extent, machine learning algorithms are capable of adjusting their own parameters, given feedback on previous performance in making prediction about a dataset. Machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm.

As used herein, "machine learning model" may refer to a mathematical model generated by machine learning algorithms based on sample data, known as training data, to make predictions or decisions without being explicitly programmed to do so. The machine learning model represents what was learned by the machine learning algorithm and represents the rules, numbers, and any other algorithm-specific data structures required to for classification.

Application integration involves the use of Application Programming Interfaces (APIs) to enable applications and systems that were built separately to work together, resulting in new capabilities and efficiencies that cut costs, uncover insights, and much more. In cases where each application is designed for its own specific purpose, but the data processed by one (upstream application) is being used as input by another (downstream application), any errors or issues occurring in the former, inevitably propagates to the latter. Entities invest a lot of time and resources to identify and mitigate these issues, which can be an arduous endeavor.

In larger entities, keeping track of the different applications that are being used, let alone be able to identify and mitigate any issues that occur is a tedious task. Entities often allocate a large amount of resources (personnel and computing) to validate these applications in an attempt to track, identify, and mitigate issues before they occur. While some are successful, the cost to implement such a system and the processing burden on the technology infrastructure overall are major concerns.

The present invention provides the functional benefit of implementing a traffic bias management engine that is configured to analyze incoming datastream from upstream applications and categorize each upstream application into one or more validation levels. In this regard, the present invention determines whether specific data values from the datastream meets preset thresholds for predetermined parameters and calculates an information bias for the upstream application. This information bias is then used to categorize the upstream application into a specific validation level. Each validation level is associated with a pre-configured set of controls that are used to validate the upstream application. Furthermore, each validation level is associated with a pre-configured set of resources that are allocated to validate the upstream application. In this way, the present invention implements a more efficient means of resource allocation to validate applications, i.e., maximizing the identification and mitigation of issues while minimizing the processing burden on the technology infrastructure.

FIG. 1 presents an exemplary block diagram of the system environment for implementing disposition bias for validating network traffic from upstream applications 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. In some embodiments, the system 130, and the user input system 140 may be used to implement the processes described herein, in accordance with an embodiment of the present invention. In this regard, the system 130 and/or the user input system 140 may include one or more applications stored thereon that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, personal digital assistants, servers, wearable devices, Internet-of-things devices, augmented reality (AR) devices, virtual reality (VR) devices, extended reality (XR) devices, automated teller machine devices, electronic kiosk devices, blade servers, mainframes, or any combination of the aforementioned. In accordance with embodiments of the invention, the user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown) in addition to the user input system 140. In some embodiments, these other computing devices may also include one or more applications (e.g., upstream applications) stored thereon that are configured to interact with one another and/or with one or more applications stored on the system 130 and/or the user input system 140, as described herein. For example, the data processed by an upstream application stored in a first computing device may be used as input by a downstream application stored in a second computing device. To validate the upstream application, the system 130 may be configured to receive the datastream from the upstream application, use the datastream to validate the upstream application, and once validated, redirects the datastream to the downstream application to be used as input. Accordingly, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140 or may also store applications or other information therein. In some embodiments, expansion memory may include instructions to carry out or supplement the processes described above and may include secure information also. For example, expansion memory may be provided as a security module for user input system 140 and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130 via the network 110. Any communication between the system 130 and the user input system 140 (or any other computing devices) may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the user input system 140 (or any other computing devices) may provide the system 130 with permissioned to access the protected resources of the user input system 130 (or any other computing devices), which may include a GPS device, an image capturing component (e.g., camera), a microphone, a speaker, and/or any of the components described herein.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation- and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 130 and the user input system 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the system 130 and the user input system 140 may have a client-server relationship, where the user input system 130 makes a service request to the system 130, the system 130 accepts the service request, processes the service request, and returns the requested information to the user input system 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some or all of the portions of the system 130 may be separated into two or more distinct portions.

FIG. 2 illustrates a process flow for implementing disposition bias for validating network traffic from upstream applications, in accordance with an embodiment of the invention. As shown in block 202, the process flow includes electronically receiving datastream from an upstream application. As used herein, "datastream" or a stream of data is a sequence of data packets used to transmit information. For an upstream application, the datastream may be output data that has been processed by the upstream application and is directed towards a downstream application as input. In some embodiments, the system may be configured to receive multiple datastreams from multiple upstream applications simultaneously.

Next, as shown in block 204, the process flow includes initiating a traffic bias management engine (TBME) on the datastream. In some embodiments, the system may be configured to use the TBME to determine the information bias for each datastream. To achieve this, first, the system may be configured to determine one or more requirements for the upstream application. These requirements may be used to analyze the datastream received from the upstream application. In some embodiments, each upstream application may be configured to provide a dedicated function. In such cases, the datastream from the upstream application and the requirements may be specific to that dedicated function. In other embodiments where an upstream application provides multiple functions, resulting in multiple datastreams, the requirements may vary for the upstream application depending on the type of function. For example, a financial institution application may have an authentication function that is used to authorize the user to access the application, a check processing function that is used to obtain an image of a check and process the check, and a funds transfer function that transfers funds to the recipient account. Each function may be associated with a datastream with information specific to that particular function. Accordingly, the requirements are specific to each datastream.

In some embodiments, the one or more requirements include at least pre-processing requirements and post-processing requirements. Each function provided by the upstream application receives input data, processes the input data to generate output data that is then directed towards downstream applications. Pre-processing requirements may be used to analyze the input data used by the upstream application to execute the function and post-processing requirements may be used to analyze the output data generated by the upstream application.

In specific embodiments, each requirement may be associated with one or more parameters and one or more thresholds for the one or more parameters. For example, a post-processing requirement such as realization requirement may include parameters such as failure rate, number of issues logged, number of times an issue required manual intervention, amount of resources used to execute the function, and/or the like. Each parameter may be associated with a threshold that is used to determine whether the upstream application meets the requirement. In one aspect, the thresholds are pre-configured by either the user and/or the system, and modifiable by the user at any time during the validation process. Then, for each parameter, the system may be configured to continuously retrieve data values from the datastream. These data values are compared against the corresponding thresholds. Based on whether or not the data values meet the thresholds, the system may be configured to determine the information bias for the upstream application.

Next, as shown in block 206, the process flow includes determining, using the TBME, an information bias for the upstream application based on at least initiating the TBME on the datastream.

In some embodiments, to determine the information bias for the upstream application, the system may employ machine learning techniques. Accordingly, the system may be configured to initiate a machine learning algorithm on historical datastream with ground truth knowledge regarding their validity. In response, the system may be configured to train, using the machine learning algorithm, a machine learning model. As described herein, a machine learning model may refer to a mathematical model generated by machine learning algorithms based on sample data, known as training data, to make predictions or decisions without being explicitly programmed to do so. By initiating the machine learning algorithm on historical datastream and their validity, the system may be configured to determine one or more classification parameters for the machine learning model to determine an information bias for unseen datastream. Once the machine learning model is trained, the system may be configured to initiate the machine learning model on the one or more data values from the datastream for the one or more parameters and the one or more requirements for the upstream application. In response, the system may be configured to determine, using the machine learning model, the information bias for the upstream application.

Next, as shown in block 208, the process flow includes determining a validation level for the upstream application based on at least the information bias. In some embodiments, each validation level may be associated with one or more validation controls. In one aspect, validation controls may include completeness and accuracy checks, identification, authentication, authorization, input controls, and forensic controls, among others. Simply put, validation controls ensure proper functioning and the confidentiality, integrity, availability, and accuracy of the upstream application and its associated data. The number or type of validation controls may vary depending on the validation level. In particular embodiments, the highest validation level may be associated with the most number of validation controls. Typically, upstream applications with lower confidence (for data accuracy) are associated with the higher validation levels while upstream applications with higher confidence are associated with lower validation levels. In other embodiments, the highest validation levels may be associated with the most computationally intensive validation controls. In this case, upstream applications with lower confidence may require validation controls that are less computationally intensive than while upstream application with higher confidence may require validation controls that are more computationally intensive. By determining the validation level for the upstream application, the system may be configured to reduce the need for testing all validation controls for each upstream application, while continuing to maintain same or similar validation standards.

In some embodiments, executing a validation control may require a specific amount and/or type of resources (e.g., computational resources). Therefore, in response to determining the validation level for the upstream application, and identifying the validation controls for that validation level, the system may be configured to determine resources to be allocated towards validating the upstream application.

In some embodiments, the system may be configured to dynamically modify the validation levels based on the information bias. In some embodiments, the system may be configured to determine that the one or more data values for at least a first portion of the one or more parameters meets the one or more thresholds at a first time instant. Accordingly, the system may be configured to determine a first information bias for the upstream application based on at least determining that the one or more data values for at least the first portion of the one or more parameters meets the one or more thresholds. In response, the system may be configured to determine a first validation level for the datastream based on at least the first information bias. In some embodiments, the system may be configured to determine that the one or more data values for at least a second portion of the one or more parameters meets the one or more thresholds at a second time instant. In response, the system may be configured to determine a second information bias for the upstream application based on at least determining that the one or more data values for at least the second portion of the one or more parameters meets the one or more thresholds. Accordingly, the system may be configured to dynamically modify the first validation level to a second validation level for the datastream based on at least the second information bias. In one aspect, as the validation levels for the datastream changes dynamically, the resources allocated toward validating the upstream application at that level will also change in real-time or near real-time.

Next, as shown in block 210, the process flow includes validating the upstream application based on at least the validation level. As described herein, validating the upstream applications may include executing the validation controls that are specific to the validation level of the upstream application. In some embodiments, the system may be configured to initiate a dashboard script configured to generate a dynamic bias display interface comprising at least the information bias, the validation level, and a validation status of the upstream application.

FIG. 3 illustrates a Traffic Bias Management Engine (TBME) 300, in accordance with an embodiment of the invention. As described herein, the TBME 300 may be configured to determine the information bias for a datastream. In this regard, each datastream is processed by the TBME 300. The TBME 300 determines an information bias for the datastream and then tags the datastream with the calculated information bias. This tagged datastream is then used to determine the validation level of the upstream application. As shown in FIG. 3, the TBME 300 may include a datastream observer 302, requirements 304, which includes the various parameters and their associated thresholds, and the machine learning model 306. The datastream observer 302 may be configured to observe the traffic from various upstream applications continuously. In doing so, the datastream observer 302 may retrieve data values from the datastream. The requirements 304 may include the various parameters and corresponding thresholds. The machine learning model 306 may be configured to use the data values from the traffic observer, the various parameters, and their corresponding threshold to determine an information bias (B) 308 for the datastream.

FIG. 4 illustrates a data flow diagram for implementing disposition bias, in accordance with an embodiment of the invention. As shown in FIG. 3, the data flow diagram includes an array of upstream applications, APPLICATION_1, APPLICATION_2, APPLICATION_3 . . . _ APPLICATION_n 402, with each upstream application having a dedicated datastream T1, T2, T3 . . . Tn that is fed into its corresponding Traffic Bias Management Engine (TBME) 300. As described herein, the TBME 300 may be configured to determine the information bias for the datastream. Once determined, the TMBE 300 tags the datastreams T1, T2, T3 . . . Tn with corresponding information bias B1, B2, B3 . . . Bn to form T1_B1, T2_B2, T3_B3 . . . Tn_Bn. Also shown in FIG. 4 is processor 404 (e.g., processor 102), which is configured to use the tagged datastream to determine the validation level for each upstream application. In addition, the processor 404 may also be configured to retrieve the validation controls corresponding to each validation level, and implement the validation controls to validate the upstream application.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for implementing disposition bias for validating network traffic from upstream applications, the system comprising:
   at least one non-transitory storage device; and
   at least one processing device coupled to the at least one non-transitory storage device, wherein the at least one processing device is configured to:
   electronically receive datastream from an upstream application, wherein the upstream application is configured to provide one or more functionalities;
   determine one or more requirements for the upstream application, wherein the one or more requirements are specific to the one or more functionalities;
   initiate a traffic bias management engine (TBME) on the datastream based on at least the one or more requirements;
   determine, using the TBME, an information bias for the upstream application based on at least initiating the TBME on the datastream;
   determine a validation level for the upstream application based on at least the information bias;
   determine a validation control based on at least the validation level, wherein the validation control is associated with a required level of computational intensity;
   determine a first set of computing resources associated with the validation control to validate the upstream application, wherein the validation control meets the required level of computational intensity; and
   validate the upstream application using the first set of computing resources.

2. The system of claim 1, wherein initiating the TBME on the datastream further comprises:
   determining the one or more requirements for the upstream application, wherein the one or more requirements are associated with one or more parameters and one or more thresholds for the one or more parameters;
   continuously retrieving one or more data values from the datastream for the one or more parameters;
   determining whether the one or more data values meets the one or more thresholds; and
   determining the information bias for the upstream application based on at least determining whether the one or more data values meets the one or more thresholds.

3. The system of claim 2, wherein determining the information bias for the upstream application further comprises:
   initiating a machine learning model on the one or more data values from the datastream for the one or more parameters and the one or more requirements for the upstream application; and
   determining, using the machine learning model, the information bias for the upstream application.

4. The system of claim 2, wherein the one or more requirements comprises at least pre-processing requirements and post-processing requirements.

5. The system of claim 2, wherein the at least one processing device is further configured to:
   continuously retrieve the one or more data values from the datastream for the one or more parameters;
   determine that the one or more data values for at least a first portion of the one or more parameters meets the one or more thresholds at a first time instant;
   determine a first information bias for the upstream application based on at least determining that the one or more data values for at least the first portion of the one or more parameters meets the one or more thresholds; and
   determine a first validation level for the datastream based on at least the first information bias.

6. The system of claim 5, wherein the at least one processing device is further configured to:
   determine that the one or more data values for at least a second portion of the one or more parameters meets the one or more thresholds at a second time instant;
   determine a second information bias for the upstream application based on at least determining that the one or more data values for at least the second portion of the one or more parameters meets the one or more thresholds; and
   dynamically modify the first validation level to a second validation level for the datastream based on at least the second information bias.

7. The system of claim 1, wherein validating the upstream application further comprises:
   determining the first set of computing resources to validate the upstream application based on at least the validation level; and
   validate the upstream application using the first set of computing resources.

8. The system of claim 1, wherein the at least one processing device is further configured to:

initiate a dashboard script configured to generate a dynamic bias display interface comprising at least the information bias, the validation level, and a validation status of the upstream application.

9. A computer program product for implementing disposition bias for validating network traffic from upstream applications, the computer program product comprising a non-transitory computer-readable medium comprising code causing a first apparatus to:
electronically receive datastream from an upstream application, wherein the upstream application is configured to provide one or more functionalities;
determine one or more requirements for the upstream application, wherein the one or more requirements are specific to the one or more functionalities;
initiate a traffic bias management engine (TBME) on the datastream based on at least the one or more requirements;
determine, using the TBME, an information bias for the upstream application based on at least initiating the TBME on the datastream;
determine a validation level for the upstream application based on at least the information bias;
determine a validation control based on at least the validation level, wherein the validation control is associated with a required level of computational intensity;
determine a first set of computing resources associated with the validation control to validate the upstream application, wherein the validation control meets the required level of computational intensity; and
validate the upstream application using the first set of computing resources.

10. The computer program product of claim 9, wherein initiating the TBME on the datastream further comprises:
determining the one or more requirements for the upstream application, wherein the one or more requirements are associated with one or more parameters and one or more thresholds for the one or more parameters;
continuously retrieving one or more data values from the datastream for the one or more parameters;
determining whether the one or more data values meets the one or more thresholds; and
determining the information bias for the upstream application based on at least determining whether the one or more data values meets the one or more thresholds.

11. The computer program product of claim 10, wherein determining the information bias for the upstream application further comprises:
initiating a machine learning model on the one or more data values from the datastream for the one or more parameters and the one or more requirements for the upstream application; and
determining, using the machine learning model, the information bias for the upstream application.

12. The computer program product of claim 10, wherein the one or more requirements comprises at least pre-processing requirements and post-processing requirements.

13. The computer program product of claim 10, wherein the code further causes the first apparatus to:
continuously retrieve the one or more data values from the datastream for the one or more parameters;
determine that the one or more data values for at least a first portion of the one or more parameters meets the one or more thresholds at a first time instant;
determine a first information bias for the upstream application based on at least determining that the one or more data values for at least the first portion of the one or more parameters meets the one or more thresholds; and
determine a first validation level for the datastream based on at least the first information bias.

14. The computer program product of claim 13, wherein the code further causes the first apparatus to:
determine that the one or more data values for at least a second portion of the one or more parameters meets the one or more thresholds at a second time instant;
determine a second information bias for the upstream application based on at least determining that the one or more data values for at least the second portion of the one or more parameters meets the one or more thresholds; and
dynamically modify the first validation level to a second validation level for the datastream based on at least the second information bias.

15. The computer program product of claim 9, wherein validating the upstream application further comprises:
determining the first set of computing resources to validate the upstream application based on at least the validation level; and
validate the upstream application using the first set of computing resources.

16. The computer program product of claim 9, wherein the code further causes the first apparatus to:
initiate a dashboard script configured to generate a dynamic bias display interface comprising at least the information bias, the validation level, and a validation status of the upstream application.

17. A method for implementing disposition bias for validating network traffic from upstream applications, the method comprising:
electronically receiving datastream from an upstream application, wherein the upstream application is configured to provide one or more functionalities;
determine one or more requirements for the upstream application, wherein the one or more requirements are specific to the one or more functionalities;
initiating a traffic bias management engine (TBME) on the datastream based on at least the one or more requirements;
determining, using the TBME, an information bias for the upstream application based on at least initiating the TBME on the datastream;
determining a validation level for the upstream application based on at least the information bias;
determining a validation level for the upstream application based on at least the information bias;
determining a validation control based on at least the validation level, wherein the validation control is associated with a required level of computational intensity;
determining a first set of computing resources associated with the validation control to validate the upstream application, wherein the validation control meets the required level of computational intensity; and
validating the upstream application using the first set of computing resources.

18. The method of claim 17, wherein initiating the TBME on the datastream further comprises:
determining the one or more requirements for the upstream application, wherein the one or more requirements are associated with one or more parameters and one or more thresholds for the one or more parameters;
continuously retrieving one or more data values from the datastream for the one or more parameters;

determining whether the one or more data values meets the one or more thresholds; and determining the information bias for the upstream application based on at least determining whether the one or more data values meets the one or more thresholds.

19. The method of claim 18, wherein determining the information bias for the upstream application further comprises:

initiating a machine learning model on the one or more data values from the datastream for the one or more parameters and the one or more requirements for the upstream application; and determining, using the machine learning model, the information bias for the upstream application.

20. The method of claim 18, wherein the one or more requirements comprises at least pre-processing requirements and post-processing requirements.

* * * * *